(12) United States Patent
Abraham et al.

(10) Patent No.: US 8,498,578 B2
(45) Date of Patent: Jul. 30, 2013

(54) DYNAMIC INTERFERENCE MANAGEMENT FOR WIRELESS NETWORKS

(75) Inventors: Santosh Abraham, San Diego, CA (US); Anastasios Stamoulis, San Diego, CA (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1312 days.

(21) Appl. No.: 12/122,480

(22) Filed: May 16, 2008

(65) Prior Publication Data

US 2009/0286481 A1 Nov. 19, 2009

(51) Int. Cl.
*H04B 1/00* (2006.01)
*H04B 15/00* (2006.01)
*H04B 17/00* (2006.01)

(52) U.S. Cl.
USPC ...................................... 455/67.11; 455/63.1

(58) Field of Classification Search
USPC ............................................ 455/63.1, 67.11
See application file for complete search history.

(56) References Cited

U.S. PATENT DOCUMENTS

| | | | |
|---|---|---|---|
| 5,732,077 A | 3/1998 | Whitehead | |
| 6,295,285 B1 | 9/2001 | Whitehead | |
| 6,967,944 B2 | 11/2005 | Choi | |
| 7,609,670 B2 | 10/2009 | Strutt et al. | |
| 7,715,426 B2 | 5/2010 | Sakoda | |
| 7,756,055 B2 | 7/2010 | Hulbert | |
| 2006/0221999 A1 | 10/2006 | Bachrach et al. | |
| 2007/0201412 A1 | 8/2007 | Ji et al. | |
| 2007/0242639 A1* | 10/2007 | Leonidov et al. | 370/335 |
| 2008/0008147 A1 | 1/2008 | Nakayama | |
| 2008/0144493 A1 | 6/2008 | Yeh | |
| 2010/0080173 A1 | 4/2010 | Takagi | |
| 2011/0003280 A1 | 1/2011 | Takahama et al. | |
| 2011/0038358 A1 | 2/2011 | Wang et al. | |
| 2011/0116401 A1 | 5/2011 | Banerjea et al. | |
| 2011/0194542 A1 | 8/2011 | Kim et al. | |
| 2011/0194644 A1 | 8/2011 | Liu et al. | |
| 2011/0222408 A1 | 9/2011 | Kasslin et al. | |
| 2012/0014361 A1 | 1/2012 | Jung et al. | |
| 2012/0320856 A1 | 12/2012 | Kim et al. | |
| 2013/0058218 A1 | 3/2013 | Wu et al. | |

FOREIGN PATENT DOCUMENTS

| | | |
|---|---|---|
| EP | 1662708 A1 | 5/2006 |
| JP | 9172405 A | 6/1997 |
| JP | 2008017325 A | 1/2008 |
| WO | WO2007051140 | 5/2007 |

OTHER PUBLICATIONS

Bharghavan, et al., "MACAW: A Media Access Protocol for Wireless LANs" Computer Communication Review, ACM, New York, NY, US, vol. 24, No. 4, Oct. 1, 1994, pp. 212-225, XP000477053.

(Continued)

*Primary Examiner* — Lewis West
(74) *Attorney, Agent, or Firm* — Nicholas J. Pauley; Sam Talpalatsky; Joseph Agusta

(57) ABSTRACT

Methods and apparatuses for dynamic interference management for wireless networks are disclosed. A node in a wireless network is configured to determine whether to cease transmissions during a period of time designated for a first node to transmit to a second node based on at least parameter relating to a channel between the first and second nodes.

33 Claims, 4 Drawing Sheets

OTHER PUBLICATIONS

International Search Report and Written Opinion—PCT/US08/064128, International Searching Authority—European Patent Office, Mar. 27, 2009.

Kim et al., "Spatial Reuse DCF for Enhancing Throughput and Performance Analysis," Sch. of Eng., Inf. & Commun. Univ., Daejeon, IEEE 68th Vehicular Technology Conference, 2008. VTC 2008-Fall, Sep. 21-24, 2008, p. 1-5.

Taiwan Search Report—TW097136158—TIPO—Jun. 14, 2012.

Kim S., et al., "Design and theoretical analysis of throughput enhanced spatial reuse distributed coordination function for IEEE 802.11", IET Communications, vol. 3, No. 12, Dec. 7, 2009, pp. 1934-1947, XP006034301, ISSN: 1751-8636, DOI: 10.1049/IET-COM:20080498 paragraphs [001.], [02.1], [02.3].

\* cited by examiner

DYNAMIC INTERFERENCE MANAGEMENT FOR WIRELESS NETWORKS

BACKGROUND

1. Field

This disclosure relates generally to wireless communications and more specifically, but not exclusively, to dynamic interference management in wireless networks.

2. Introduction

Recently, there has been a tremendous growth in the deployment of Wireless Local Area Networks (WLAN), such as IEEE 802.11 and the like. As these networks become more prevalent and begin working in closer proximity to one another, frequency reuse will be increasingly important to ensure efficient medium utilization. Currently, frequency reuse is severely limited in some WLANs, especially for larger packets, because, in order to avoid packet collisions and reduce interference in these WLANs, all nodes in the vicinity of a transmitting/receiving node pair are required to cease all transmissions for the duration of a frame being sent between the transmitting/receiving pair. However, allowing full frequency reuse in such networks results in increased outage and very low throughput for some nodes in the system. Thus, there is a need for dynamic interference management in WLANs that combines the gains of frequency reuse while mitigating impacts such as outage and low throughput.

SUMMARY

In one aspect of the disclosure, an apparatus for wireless communications includes a processing system configured to determine whether to cease transmissions during a period of time designated for a first node to transmit to a second node based on at least one parameter related to a channel between the first and second nodes.

In another aspect of the disclosure, a method for wireless communications includes determining whether to cease transmissions during a period of time designated for a first node to transmit to a second node based on at least one parameter related to a channel between the first and second nodes.

In a further aspect of the disclosure, an apparatus for wireless communications includes means for identifying a period of time designated for a first node to transmit to a second node, and means for determining whether to cease transmissions during the period of time based on at least one parameter related to a channel between the first and second nodes.

In yet a further aspect of the disclosure, a computer-program product for communication includes a machine-readable medium comprising instructions executable by a processing system to determine whether to cease transmissions during a period of time designated for a first node to transmit to a second node based on at least one parameter related to a channel between the first and second nodes.

In another aspect of the disclosure, an access terminal for wireless communications includes a processing system configured to determine whether to cease transmissions during a period of time designated for a first node to transmit to a second node based on at least one parameter related to a channel between the first and second nodes, and a user interface supported by the processing system.

In yet another aspect of the disclosure, an access point for wireless communications includes a wireless network adapter configured to support a backhaul connection for an access terminal, and a processing system configured to control the wireless network adapter, the processing system being further configured to determine whether to cease transmissions during a period of time designated for a first node to transmit to a second node based on at least one parameter related to a channel between the first and second nodes.

BRIEF DESCRIPTION OF THE DRAWINGS

Various aspects of a communications system are illustrated by way of example, and not by way of limitation, in the accompanying drawings, where like reference numerals may be used to denote like features throughout the specification and drawings, wherein.

Figure 1:
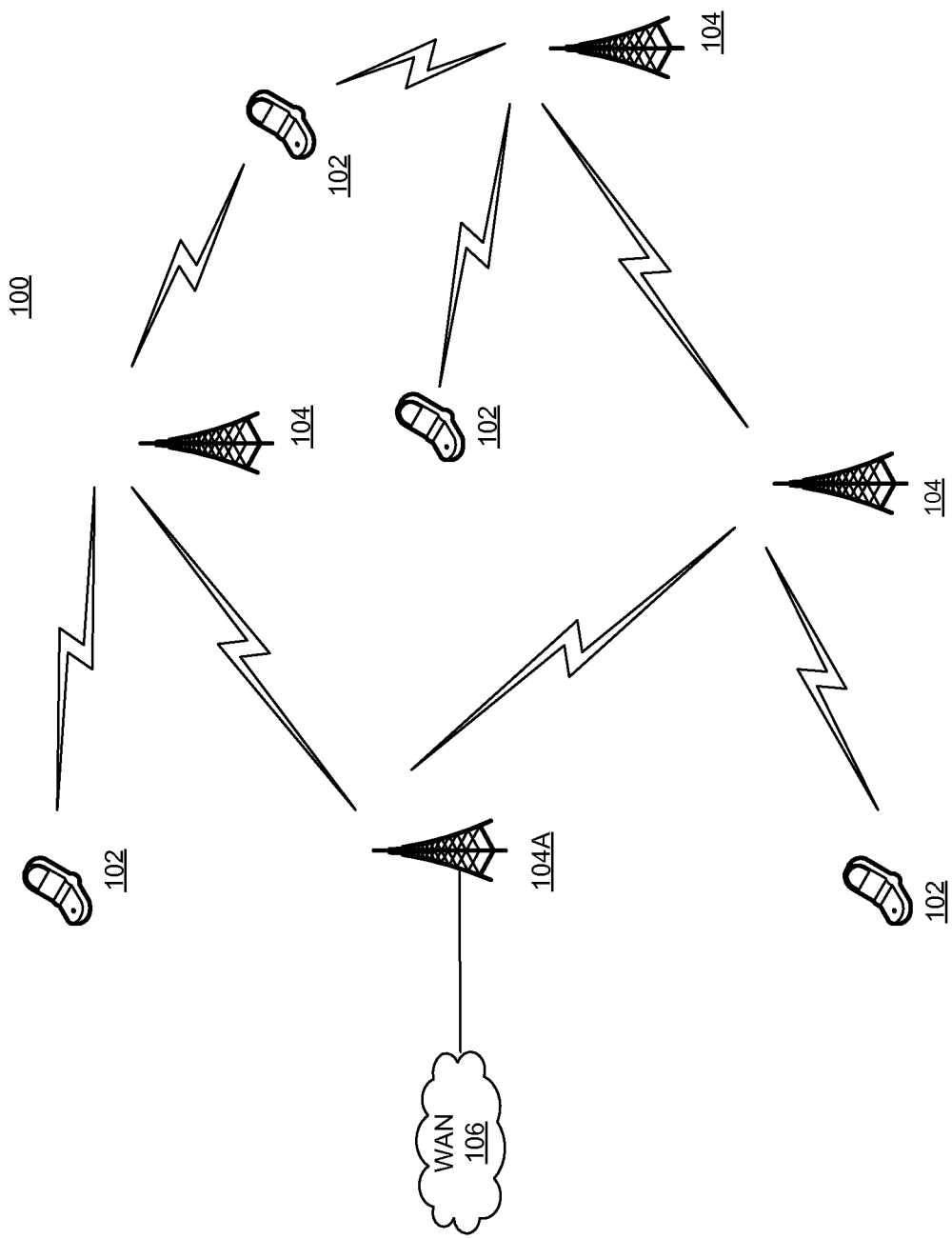
FIG. 1 is a conceptual block diagram illustrating an example of a wireless network.

In accordance with common practice, the various features illustrated in the drawings are intended as a description of various aspects of networks and network-related entities and is not intended to represent the only aspects within the scope of the claims. The drawings may include specific details for the purpose of providing a thorough understanding of a network or network-related entity, however, various aspects of the described networks and network-related entities may be implemented without these specific details. In some instances, well-known structures and components are shown in block diagram form in order to avoid obscuring various concepts described throughout this disclosure.

DETAILED DESCRIPTION

Various aspects of one or more methods and apparatuses are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect of any apparatus or method described throughout this disclosure may include a single element of any claim and/or any combination of elements in one or more claims.

In the following detailed description, various aspects of one or more methods and apparatuses may be described in the context of IEEE 802.11 WLAN. However, as those skilled in the art will readily appreciate, the various aspects presented throughout this disclosure may be extended to a broad array of networks and communication protocols. Accordingly, any reference to a IEEE 802.11 WLAN is intended only to illustrate various aspects of a network, with the understanding that such aspects have a wide range of applications.

FIG. 1 is a conceptual block diagram illustrating an example of a wireless communications network 100. The wireless network 100 may be a WLAN, such as an IEEE 802.11 network, or any other suitable network. The wireless network 100 is shown with several nodes 102, which may be mobile and/or fixed depending on the particular configuration of the network 100. A node 102 may be configured as a mobile telephone, a personal digital assistant (PDA), laptop computer, a digital audio player, a game console, a digital camera, a digital camcorder, a multimedia device, or any other suitable device capable of supporting a wireless connection in the network 100. These nodes 102 may be referred to throughout this disclosure as access terminals, but may also be referred to by those skilled in the art as handsets, wireless communication devices, user terminals, user equipment, mobile stations, mobile units, subscriber units, subscriber stations, mobile radios, radio telephones, wireless stations, wireless devices, or some other terminology. The various concepts described throughout this disclosure are intended to apply to all access terminals regardless of their specific nomenclature.

The wireless network 100 may also include several infrastructure nodes 104, which are shown as fixed-site transceiver stations but may be implemented as mobile nodes in other configurations. These nodes 104 may be referred to throughout this disclosure as access points, but may also be referred to by those skilled in the art as NodeBs, radio network controllers (RNCs), eNodeBs, base station controllers (BSCs), base transceiver stations (BTSs), base stations (BSs), transceiver functions (TFs), radio routers, radio transceivers, basic service sets (BSSs), extended service sets (ESSs), radio base stations (RBSs), or some other suitable terminology. As started above in connection with access terminals, the various concepts described throughout this disclosure are intended to apply to all access points regardless of their specific nomenclature.

An access terminal 102 may connect to an access point 104, or any other access terminal 102 in the network 100, either directly or through one or more intermediate nodes. An intermediate node may be an access terminal 102, an access point 104, or some other network related entity. The wireless topology may be dynamically reconfigurable to maintain the connection as the access terminals 102 move throughout the coverage region and the loading on the access points 104 changes. In one configuration of the network 100, the access points 104 may be distributed throughout a Wireless Wide Area Network (WWAN), such as might be the case in a network employing Wi-Max, Evolution-Data Optimized (EV-DO), Ultra Mobile Broadband (UMB), or some other suitable wireless standard. In another configuration of the network 100, the access points 104 may be distributed throughout a WLAN in a home, office building, airport, hotel, coffee shop, or other suitable private or public locale.

The geographic reach of the 100 may be extended through a Wide Area Network (WAN) 106 such as the Internet or the like. In this example, any number of access points 104, and in some cases access terminals 102, may combine to provide a wireless backhaul to the WAN 106 for other access terminals. A single access point 104A may provide an access point to the WAN 106 through a wired connection as shown in FIG. 1, or alternatively, any number of access points 104 may have a wired or wireless connection to the WAN 106.

Figure 2:
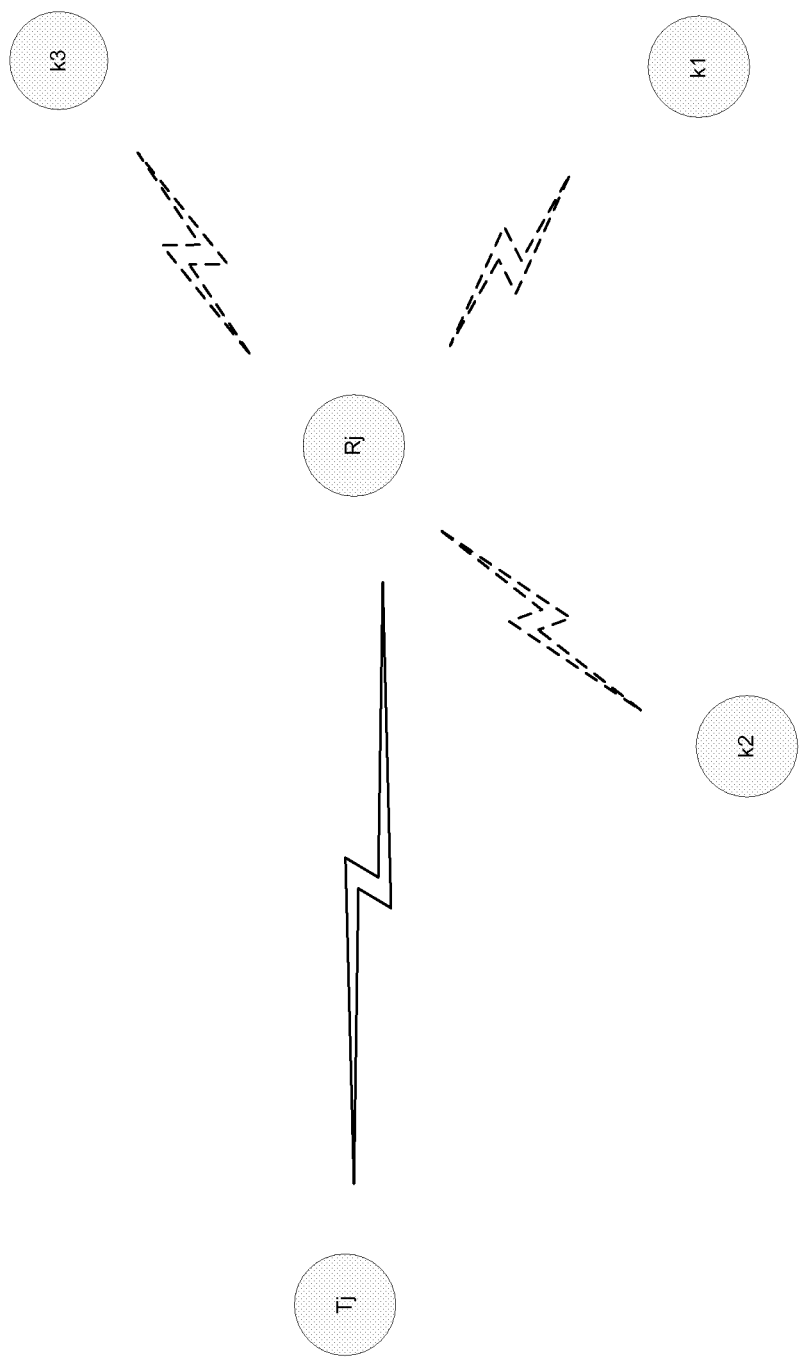
FIG. 2 is a conceptual block diagram illustrating a simplified example of a wireless network.

An example of a method for dynamic interference management is shown with reference to FIG. 2. For ease of explanation, FIG. 2 shows a simplified version of a network, similar to the wireless network 100 of FIG. 1, in which nodes $T_j$, $R_j$, and $k(k_1-k_3)$ may represent any of the wireless nodes designated as nodes 102 and 104 in FIG. 1. In the example shown in FIG. 2, the node designated as "$T_j$" is the transmitting node and the node designated as "$R_j$" is the receiving node of the signal from the transmitting node $T_j$. However both the transmitting and receiving nodes may be capable of performing both transmit and receiving functions. Depending on various factors, such as the proximity of the nodes, a transmission by any of the nodes k may potentially interfere with the reception at the receiving node $R_j$.

Prior to transmitting data to the receiving node $R_j$, the transmitting node $T_j$ reserves the medium (channel) by sending a message to the receiving node $R_j$ requesting to transmit data at certain time. If the receiving node $R_j$ is able to accept the transmission at that time, receiving node $R_j$ may respond to the transmission request with a grant message, allowing the transmitting node $T_j$ to transmit the data. When the receiving node $R_j$ transmits the grant message to transmitting node $T_j$ nearby nodes $k_1$-$k_3$ also "hear" (detect) the grant message. When the nearby nodes $k_1$-$k_3$ detect the grant message, they each may make a determination as to whether to remain silent while the transmitting node $T_j$ is sending data to the receiving node $R_j$. The nodes $k_1$-$k_3$ may make such determination based on their potential to interfere with the reception at the receiving node $R_j$, as explained below.

In this example, each node k may be configured to determine whether to remain silent (i.e., cease transmissions) during a transmission from the transmitting node $T_j$ to the receiving node $R_j$ based on a term $q_{kj}$ that represents the likelihood that the node k will not interfere with the transmission between the transmitting and receiving nodes $T_j$, $R_j$. The term $q_{kj}$ may be computed from (1) a metric related to one or more channel parameters between the transmitting and receiving nodes $T_j$, $R_j$, and (2) the path loss between the node k and the receiving node $R_j$. The channel parameters may include, by way of example, the channel gain between the transmitting and receiving nodes $T_j$, $R_j$ and the desired signal-to-noise ratio (SNR) at the receiving node $R_j$. By way of example, if the channel gain between the transmitting and receiving nodes $T_j$, $R_j$ is high, the desired SNR at the receiving node $R_j$ is low, and the path loss between the node k and the receiving node $R_j$ is high, then the likelihood that a transmission by the node k will interfere with a transmission between the transmitting and receiving nodes $T_j$, $R_j$ is low. Conversely, if the channel gain between the transmitting and receiving nodes is low $T_j$, $R_j$, the desired SNR at the receiving node $R_j$ is high, and the path loss between the node k and the receiving node $R_j$ is low, then the likelihood that a transmission by the node k will interfere with a transmission between the transmitting and receiving nodes $T_j$, $R_j$ is high.

An example of a formula for determining the term $q_{kj}$ will now be described with respect to equations 1 and 2 below. In the following equations, $\gamma$ represents the desired SNR at the receiving node $R_j$; $h_{jj}$ represents the channel gain between the transmitting and receiving nodes $T_j$, $R_j$; $h_{kj}$ represents the path loss between the node k and the receiving node $R_j$. Using these terms, the signal power between the transmitting and receiving nodes $T_j$, $R_j$ can be represented by $(h_{jj})(\gamma)$ and the total interference at the receiving node $R_j$ can be represented by $(h_{kj})(q_{kj})$. In order to mitigate interference at the receiving node $R_j$, it is desired that the signal power be greater than the total interference at the receiving node $R_j$. Thus, for all k, it is desired that (eq. 1):

$$\sum_{k \neq j} h_{kj} q_{kj} \leq h_{jj} \gamma$$

From equation 1, the following formulation for $q_{kj}$ may be obtained, as follows (eq. 2):

$$q_{kj} = \max\left(\min\left(f\left(\frac{h_{jj}}{g(\gamma)h_{kj}}\right), 1\right), 0\right)$$

where f is a monotonic increasing function, such as a logarithmic function, and g( ) is a function that may depend on the neighborhood of the receiving node $R_j$. In this example, if $q_{kj}$=0, the node k is silent while data is being sent from the transmission node $T_j$ to the receiving node $R_j$. Conversely, if $q_{kj}$=1, the node k can transmit while data is being sent from the transmission node $T_j$ to the receiving node $R_j$. In the event that $q_{kj}$ is between 0 and 1, a threshold may be used to determine whether the node k should be silent. By way of example, the node k may be silent if $q_{kj}$<0.5, and transmit if $q_{kj}$>0.5. The precise formulation and/or threshold used for any node k may vary depending on the specific application and the overall design constraints imposed on the overall system.

A node k can calculate the path loss $h_{kj}$ between itself and the receiving node $R_j$ based on a preamble contained in a packet received from the receiving node $R_j$. By way of example, if a packet from the receiving node $R_j$ is transmitted at a constant transmit power, the node k can measure the power and compute the gain, or path loss, between the node k and receiving node $R_j$ from the measured power.

The metric, which relates to one or more channel parameters between the transmitting and receiving nodes $T_j$, $R_j$, may be provided to the node k by the receiving node $R_j$. Alternatively, the one or more channel parameters can be provided to the node k by the receiving node $R_j$. As described earlier, the channel parameters may include the channel gain $h_{jj}$ between the transmitting and receiving nodes $T_j$, $R_j$, and the desired SNR $\gamma$ at the receiving node $R_j$. The metric, or the channel parameters, may be included in the grant message sent by the receiving node $R_j$ to the transmitting node $T_j$. Alternatively, the metric, or the channel parameters, may be sent in a separate broadcast on a common channel, a transmission to the node k on a dedicated overhead channel, or by any other suitable means.

In some configurations, when a node k receives a metric, or one or more channel parameters, between a transmitting and receiving node pair $T_j$, $R_j$, the node k may store the metric, or channel parameter(s), in memory for future use. The received metric, or channel parameter(s), may be saved according to the source and destination addresses, or other identifiers of the transmitting and receiving node pair $T_j$, $R_j$, in the grant message or other broadcast. A look-up table may be constructed by the node k with the metric, or channel parameter(s), for all transmitting and receiving node pairs $T_j$, $R_j$ in its vicinity. In this way, the node k only needs to receive a broadcast from a receiving node $R_j$ which indicates the time of the transmission from the transmitting node $T_j$. If the node k is also scheduled to transmit at the same time, it can quickly access memory to retrieve the metric, or channel parameter(s), for the transmitting and receiving node pair $T_j$,$R_j$ and compute the term $q_{kj}$. Based on the computed term, the node k can determine whether or not to transmit during its scheduled time.

The algorithm employed to determine whether or not to transmit may be application specific and dependent upon a number of other factors. By way of example, the node k may be configured to transmit only if the term $q_{kj}$ computed for each transmitting and receding node pair $T_j$,$R_j$ is above a threshold (e.g., 0.5), or if the term $q_{kj}$ computed for some majority of transmitting and receding node pairs $T_j$,$R_j$ is above a threshold. The threshold may be fixed or dynamically reconfigurable. The threshold may be the same for each transmitting and receding node pair $T_j$,$R_j$ or different. As an example of the latter, the node k may be configured to transmit only if the term $q_{kj}$ for each high priority transmitting and receding node pair $T_j$,$R_j$ is 1 and the term $q_{kj}$ for each low priority transmitting and receding node pair $T_j$,$R_j$ is above 0.5. A high priority transmitting and receding node pair $T_j$,$R_j$ may involve telephony whereas a low priority transmitting and receding node pair $T_j$,$R_j$ may involve text messaging. Those skilled in the art will readily be able to determine the transmission criteria for each node k in a wireless network.

Figure 3:
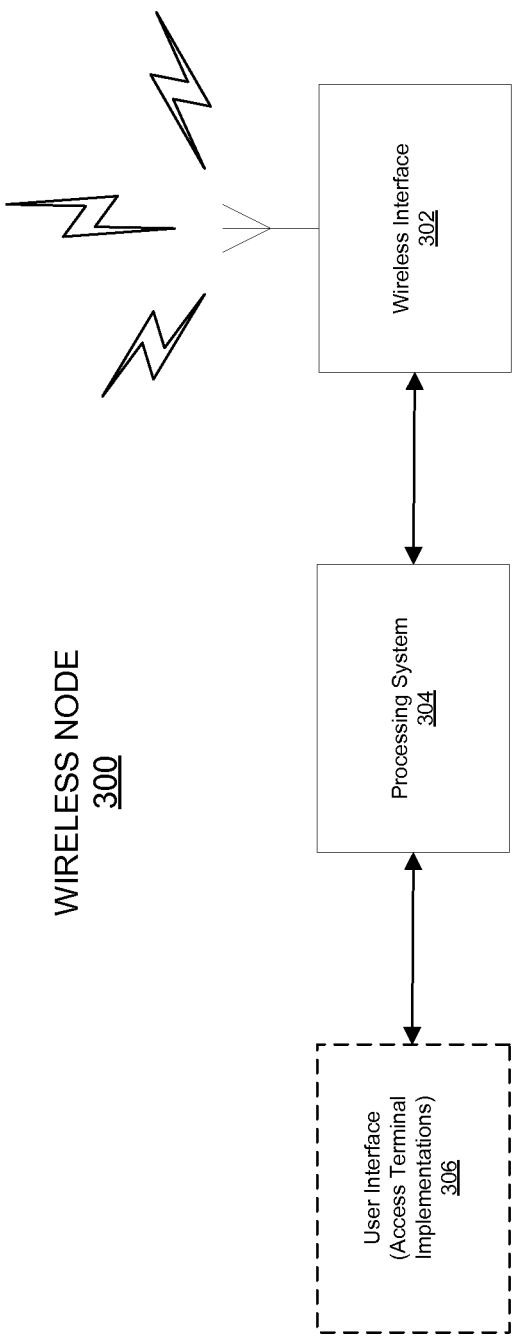
FIG. 3 is a block diagram illustrating an example of the functionality of a node.

FIG. 3 is a block diagram illustrating an example of the functionality of a node. The following description of a node 300 is informative in nature and broadly defines the functionality of each block. Only the functionality pertinent to various concepts disclosed herein will be described. Those skilled in the art will recognize that these functional blocks can provide other functionality that is not described herein. In this example, the node 300 includes at least two functional blocks: a wireless interface 302 and a processing system 304.

The wireless interface 302 may be configured as a transceiver that provides both a transmitting and receiving function. The transmitting function includes modulating a carrier with data. The receiving function includes demodulating a carrier to recover data. The wireless interface 302 may also provide various other functions, such as RF front-end processing, analog/digital conversion, timing and frequency estimation, channel estimation, turbo coding etc. In summary, the wireless interface 302 may be configured to provide the complete physical layer implementation of the node 300.

The processing system 304, either alone or in combination with other entities in the node 300, may be configured to implement all functionality above the physical layer. Alternatively, the processing system 304 may also implement all or part of the physical layer. In the most general terms, the processing system 304 is configured to use the transmitting and receiving functions of the wireless interface 302 to support communications. In addition, the processing system 304 may be configured to determine whether to cease transmissions during a period of time when one or more transmitting nodes are transmitting to one or more corresponding receiving nodes in the network.

The node 300 may function as an access terminal, access point, relay point, or any combination thereof. A node 300 that functions as an access terminal may include a user interface 306. The user interface 306 may include a display, keypad, speaker, microphone, and/or any other suitable interface that enables a user to operate the access terminal. The user interface 306 is used to control the data that is transmitted and received by the processing system 304 over a wireless uplink connection maintained by the wireless interface 302.

A node 300 that functions as an access point includes a wireless interface 302 that is capable of maintaining any suitable number of wireless downlink connections with access terminals and/or relay points, as well as maintain one or more uplink connections to support the backhaul. The uplink connection may be wired or wireless. By way of example, the access point may support a wireless uplink connection to a relay point and a wired uplink connection to another network (e.g., the Internet).

The processing system 304 may be implemented using software, hardware, or a combination of both. By way of example, a processing system may be implemented with one or more integrated circuits (IC). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. A processing system may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system. Moreover, in some aspects any suitable computer-program product may comprise a computer-readable medium or machine-readable medium comprising codes relating to one or more of the aspects of the disclosure. In some aspects a computer program product may comprise packaging materials.

Figure 4:
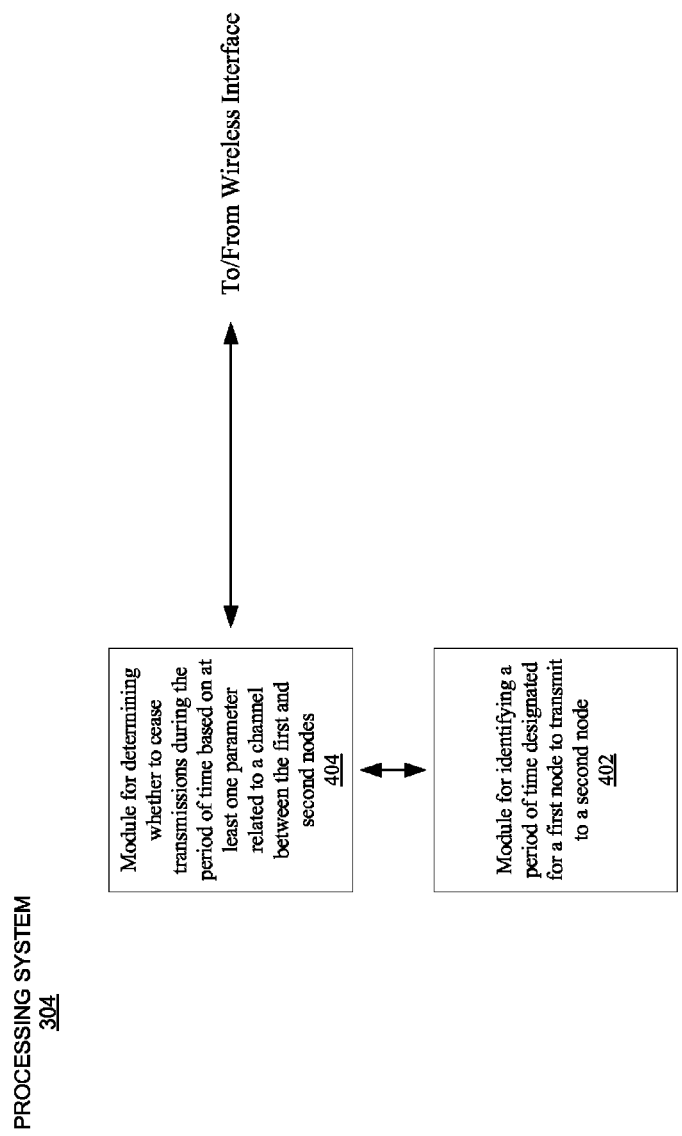
FIG. 4 is a block diagram illustrating an example of the functionality of a processing system for a node.

FIG. 4 is a block diagram illustrating an example of the functionality of a processing system 304. In this example, the processing system 304 includes a module 402 for identifying a period of time designated for a first node to transmit to a second node, and a module 404 for determining whether to cease transmissions during the period of time based on at least one parameter related to a channel between the first and second nodes.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising: a processing system at a third node configured to determine whether to cease transmissions during a period of time designated for a first node to transmit to a second node based on at least one parameter related to a channel between the first and second nodes, wherein the processing system is further configured to calculate a path loss between the second node and the third node and use the calculated path loss in determining whether to cease transmission.

2. The apparatus of claim 1 wherein said at least one parameter comprises a channel gain between the first and second nodes.

3. The apparatus of claim 1 wherein said at least one parameter comprises a desired signal-to-noise ratio at the second node.

4. The apparatus of claim 1 wherein the processing system calculates the path loss based on a preamble contained in at least one packet transmitted by the second node.

5. The apparatus of claim 1 wherein the processing system is further configured to determine whether to cease transmissions based on a metric from the second node, the metric being based on said at least one parameter.

6. The apparatus of claim 5 wherein the processing system is further configured to store the metric, the processing system being further configured to receive a message from the second node indicating the designated period of time for the first node to transmit to the second node and determine whether to cease transmissions based on the stored metric in response to the message.

7. The apparatus of claim 6 wherein the message identifies the first and second nodes, and wherein the processor uses the identity of the first and second nodes to retrieve the stored metric.

8. The apparatus of claim 5 wherein said at least one parameter comprises a channel gain between the first and second nodes and a desired signal-to-noise ratio at the second node, and wherein the metric comprises a ratio of the channel gain to the desired signal-to-noise ratio.

9. The apparatus of claim 8 wherein the processing system is further configured to compute a term based on the metric and a path loss between the apparatus and the second node, and determine whether to cease transmissions based on the computed term.

10. The apparatus of claim 9 wherein the processing system is further configured to determine whether to cease transmissions by comparing the computed term to a threshold.

11. A method for wireless communications, comprising:
Determining, at a third node, whether to cease transmissions during a period of time designated for a first node to transmit to a second node based on at least one parameter related to a channel between the first and second nodes; and
calculating a path loss between the third node and the second node, wherein the determining of whether to cease transmissions is further based on the calculated path loss.

12. The method of claim 11 wherein said at least one parameter comprises a channel gain between the first and second nodes.

13. The method of claim 11 wherein said at least one parameter comprises a desired signal-to-noise ratio at the second node.

14. The method of claim 11 wherein the path loss is calculated based on a preamble contained in at least one packet transmitted by the second node.

15. The method of claim 11 further comprising:
receiving a metric from the second node, said metric being based on said at least one parameter, and
determining whether to cease transmissions based on the metric.

16. The method of claim 15 further comprising storing the metric and receiving a message from the second node indicating the designated period of time for the first node to transmit to the second node, wherein the stored metric is used to determine whether to cease transmissions in response to the message.

17. The method of claim 16 wherein the message identifies the first and second nodes, the method further comprising retrieving the stored metric using the identity of the first and second nodes.

18. The method of claim 15 wherein said at least one parameter comprises a channel gain between the first and second nodes and a desired signal-to-noise ratio at the second node, and wherein the metric comprises a ratio of the channel gain to the desired signal-to-noise ratio.

19. The method of claim 18 further comprising computing a term based on the metric and a path loss to the second node, wherein the computed term is used to determine whether to cease transmissions.

20. The method of claim 19 further comprising comparing the computed term to a threshold, and wherein the comparison between the computed term and the threshold is used to determine whether to cease transmissions.

21. An apparatus for wireless communications, comprising:
means for identifying a period of time designated for a first node to transmit to a second node;
means for determining whether to cease transmissions during the period of time based on at least one parameter related to a channel between the first and second nodes; and
means for calculating a path loss between a third node and the second node, wherein the means for determining whether to cease transmissions is configured to make that determination based further on the calculated path loss.

22. The apparatus of claim 21 wherein said at least one parameter comprises a channel gain between the first and second nodes.

23. The apparatus of claim 21 wherein said at least one parameter comprises a desired signal-to-noise ratio at the second node.

24. The apparatus of claim 21 wherein the means for calculating a path loss is configured to calculate such path loss based on a preamble contained in at least one packet transmitted by the second node.

25. The apparatus of claim 21 further comprising means for receiving a metric from the second node, the metric being based on said at least one parameter, and wherein the means for determining whether to cease transmissions is configured to use the metric to make that determination.

26. The apparatus of claim 25 further comprising means for storing the metric and means for receiving a message from the second node indicating the designated period of time for the first node to transmit to the second node, wherein the means for determining whether to cease transmissions is configured to use the stored metric to make that determination in response to the message.

27. The apparatus of claim 26 wherein the message identifies the first and second nodes, the apparatus further comprising means for retrieving the stored metric using the identity of the first and second nodes.

28. The apparatus of claim 25 wherein said at least one parameter comprises a channel gain between the first and second nodes and a desired signal-to-noise ratio at the second node, and wherein the metric comprises a ratio of the channel gain to the desired signal-to-noise ratio.

29. The apparatus of claim 28 further comprising means for computing a term based on the metric and a path loss between the apparatus and the second node, wherein the means for determining whether to cease transmissions is configured to use the computed term to make such determination.

30. The apparatus of claim 29 further comprising means for comparing the computed term to a threshold, and wherein the means for determining whether to cease transmissions is configured to use the comparison between the computed term and the threshold to make such determination.

31. A computer-program product for communication, comprising:
a machine-readable storage medium comprising instructions executable by a processing system to:
determine whether to cease transmissions during a period of time designated for a first node to transmit to a second node based on at least one parameter related to a channel between the first and second nodes, and wherein the processing system is further configured to calculate a path loss between a third node and the second node and use the calculated path loss in determining whether to cease transmission.

32. An access terminal, comprising:
a processing system configured to determine whether to cease transmissions during a period of time designated for a first node to transmit to a second node based on at least parameter related to a channel between the first and second nodes, wherein the processing system is further configured to calculate a path loss between a third node and the second node and use the calculated path loss in determining whether to cease transmission; and
a user interface supported by the processing system.

33. An access point, comprising:
a wireless network adapter configured to support a backhaul connection for an access terminal; and
a processing system configured to control the wireless network adapter, the processing system being further configured to determine whether to cease transmissions during a period of time designated for a first node to transmit to a second node based on at least one parameter related to a channel between the first and second nodes, wherein the processing system is further configured to calculate a path loss between a third node and the second node and use the calculated path loss in determining whether to cease transmission.

* * * * *